United States Patent
Or

(10) Patent No.: US 11,213,027 B2
(45) Date of Patent: Jan. 4, 2022

(54) COMBINED ADMINISTRATION OF A PENETRATION AGENT AND A SULFUR CONTAINING COMPOUND TO PLANTS

(71) Applicant: THE STATE OF ISRAEL, MINISTRY OF AGRICULTURE & RURAL DEVELOPMENT, AGRICULTURAL RESEARCH, Bet Dagan (IL)

(72) Inventor: Etti Or, Bat Hefer (IL)

(73) Assignee: THE STATE OF ISRAEL, MINISTRY OF AGRICULTURE & RURAL DEVELOPMENT, AGRICULTURAL RESEARCH ORGANIZATION, (A.R.O), THE VOLCANI CENTER, Bet Dagan (IL)

( * ) Notice: Subject to any disclaimer, the term of this patent is extended or adjusted under 35 U.S.C. 154(b) by 0 days.

(21) Appl. No.: 16/076,783

(22) PCT Filed: Jan. 30, 2017

(86) PCT No.: PCT/IL2017/050108
§ 371 (c)(1),
(2) Date: Aug. 9, 2018

(87) PCT Pub. No.: WO2017/137975
PCT Pub. Date: Aug. 17, 2017

(65) Prior Publication Data
US 2019/0059367 A1    Feb. 28, 2019

Related U.S. Application Data

(60) Provisional application No. 62/929,882, filed on Feb. 9, 2016.

(51) Int. Cl.
| | |
|---|---|
| A01N 31/02 | (2006.01) |
| A01N 25/30 | (2006.01) |
| A01N 41/02 | (2006.01) |
| A01N 41/04 | (2006.01) |
| A01N 31/00 | (2006.01) |
| A01N 25/10 | (2006.01) |

(52) U.S. Cl.
CPC ............ *A01N 31/02* (2013.01); *A01N 25/10* (2013.01); *A01N 25/30* (2013.01); *A01N 31/00* (2013.01); *A01N 41/02* (2013.01); *A01N 41/04* (2013.01)

(58) Field of Classification Search
CPC combination set(s) only.
See application file for complete search history.

(56) References Cited

U.S. PATENT DOCUMENTS 8,202,557 B1    6/2012    Doty

FOREIGN PATENT DOCUMENTS

| JP | H07126108 A | 5/1995 |
|---|---|---|
| MX | 2008000929 A | 6/2009 |
| WO | 9423574 A1 | 10/1994 |
| WO | 9601049 A1 | 1/1996 |
| WO | 0105227 A1 | 1/2001 |

OTHER PUBLICATIONS

Kubota, Naohiro, et al. "Identification of active substances in garlic responsible for breaking bud dormancy in grapevines." Journal of the Japanese Society for Horticultural Science 68.6 (1999): 1111-1117.*
Erez, A., and Z. Yablowitz. "Effect of dormancy breaking agents with Armobreak in the peach." V Temperate Zone Fruit in the Tropics and Subtropics 441 (1996): 183-190.*
Lombard, P. J., J. A. Viljoen, and E. E. H. Wolf. "Preliminary results for the evaluation of new rest breaking agents on table grapes in South Africa." XXV International Horticultural Congress, Part 4: Culture Techniques with Special Emphasis on Environmental Implications 514. 1998.*
International Search Report PCT/IL2017/050108 Completed Apr. 23, 2017; dated May 31, 2017 2 pages.
Written Opinion of the International Searching Authority PCT/IL2017/050108 dated May 31, 2017 5 pages.
Biasi et al., "Lime sulphur mineral oil and garlic extract to suppress dormancy of kiwi", Revista De Ciencias Agrovetinarias, vol. 9, No. 1, pp. 58-65, 2010.
Wang et al., "Changes in the Antioxidant System Associated with Budbreak in 'Anna' Apple (*Malus domestica* Borkh.) Buds", J. Amer. Soc. Hort. Sci. 119(4):735-741. 1994.
Vargas-Arispuro et al., "Compounds Derived From Garlic as Bud Induction Agents in Organic Farming of Table Grape", Chilean Journal of Agricultural Research, 68(1):94-101, 2008.

* cited by examiner

*Primary Examiner* — John Pak
*Assistant Examiner* — Daniel L Branson
(74) *Attorney, Agent, or Firm* — The Roy Gross Law Firm, LLC; Roy Gross

(57) ABSTRACT

Disclosed is a method of enhancing bud break in plants, comprising administering a combination of an amine polymer delivery agent and a sulfur containing compound to said plants. Disclosed also is a formulation comprising an amine polymer delivery agent and a sulfur containing compound. In addition, the use of such a formulation for enhancing bud break in plants is also disclosed.

14 Claims, 24 Drawing Sheets

COMBINED ADMINISTRATION OF A PENETRATION AGENT AND A SULFUR CONTAINING COMPOUND TO PLANTS

RELATED APPLICATIONS

This application is a National Phase of PCT Patent Application No. PCT/IL2017/050108 having International filing date of Jan. 30, 2017, which claims the benefit of priority of U.S. Patent Application No. 62/292,882 filed on Feb. 9, 2016. The contents of the above applications are all incorporated by reference as if fully set forth herein in their entirety.

FIELD OF THE INVENTION

The invention is directed to the combined administration of a penetration agent and a sulfur containing compound to plants. The invention is further directed to the combined use of a penetration agent and a sulfur containing compound for enhancing bud break.

BACKGROUND OF THE INVENTION

In warm winter regions, where the table grape industry is preferentially located, artificial induction of bud dormancy release, known also as bud break, is mandatory in order to coordinate the early production of economical grape yields. The single effective artificial stimulus available for commercial use in vineyards is hydrogen cyanamide (HC). However, the ability of HC to induce respiratory stress, which initiates a biochemical cascade that leads to effective dormancy release, is also responsible for its toxicity, both to the vines and to the environment. Such phytotoxic effects, which may results in irregular ripening and significant yield losses, coupled with new European regulations that are expected to ban the use of HC in the deciduous tree industry, create a need for the development of safe and powerful alternatives for artificial induction of bud dormancy release.

Several studies have documented the potential use of garlic extracts and its volatiles as inducers of grape bud break. Initially, it was shown that brushing freshly ground garlic paste on the cut surface of cans from three grapevine cultivars enhanced bud break in comparison to the control. However, its enhancing effect was relatively mild and inferior even to the use of calcium cyanamid, which is known to be less effective than HC. It has further been published that the active compounds in garlic that are able to, not very effectively, enhance grapevine bud break, are volatile compounds containing sulfur and allyl groups. Diallyl disulphide (DADS), for example, was recorded as particularly effective. Additionally, DADS was shown to enhanced bud break of corms, tubers and apple buds, suggesting the activation of a mechanism common to various meristem-containing organs. The bud break enhancing effect reported was generally achieved when garlic extract or its volatiles were either brushed on surface of single-node cuttings, or incubated with the cuttings in sealed jars. However, it was also shown that the enhancing effect of DADS, when applied to the whole vine, rather than to cuttings, was very limited and inferior to the known HC. In the case of garlic paste, even when applied on cuttings it was proved to be inferior to HC. Thus, although garlic paste, DADS and similar products have shown to be more efficient than the control in initiating bud break, they all provide results highly inferior to those provided by HC under vineyard conditions. Thus, there is a need to provide a formulation and an administration method that is at least closely as efficient as HC is in enhancing bud break to whole vines under field conditions.

SUMMARY OF THE INVENTION

Embodiments of the invention are directed to a method of enhancing budbreak in plants, comprising administering a combination of an amine polymer delivery agent and a sulfur containing compound to said plants.

According to some embodiments, the plant is a deciduous plant. According to some embodiments, the plant is a grapevine, kiwi or rosacea. According to some embodiments, the combination is administered to the plant bulbs, tubers, roots, branches, trunk or any combination thereof.

According to some embodiments, the amine polymer delivery agent and the sulfur containing compound are administered as a single formulation. According to some embodiments, the amine polymer delivery agent and the sulfur containing compounds are administered in two separate formulations, at the same time, consecutively, at different times, at the same intervals, at different intervals or any combination thereof.

According to some embodiments, the amine polymer delivery agent is an alkyl amine polymer. According to some embodiments, the amine polymer delivery agent is Armobreak®. According to some embodiments, the sulfur containing compound is diallyl disulfide (DADS), diallyl sulfide, diallyl trisulfide, diethyl sulfide, diethyl disulfide, dimethyl sulfide, dimethyl trisulfide, dimethyl disulfide, triallyl disulfide, sulfur compounds containing allyl, methyl, n-butyl, n-propyl, thiosulfate, thiosulfonate, mercaptan groups, allicin, allyl iso thiocyanate, S-methyl cysteine sulfoxide, dimethyl thiosulfonate, allyl mecaptan, methyl mercaptan, and any combination thereof. According to some embodiments, the sulfur containing compound is a sulfide. According to some embodiments, the sulfide is diallyl disulfide (DADS), diallyl sulfide, diallyl trisulfide, diethyl sulfide, diethyl disulfide, dimethyl sulfide, dimethyl trisulfide, dimethyl disulfide, triallyl disulfide or any combination thereof.

Embodiments of the invention are directed to a formulation comprising an amine polymer delivery agent and a sulfur containing compound. According to some embodiments, the formulation is in a form of a spray. Further embodiments of the invention are directed to the use of the formulation, as described herein, for enhancing budbreak in plants.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

DETAILED DESCRIPTION OF EMBODIMENTS OF THE INVENTION

Figure 1:
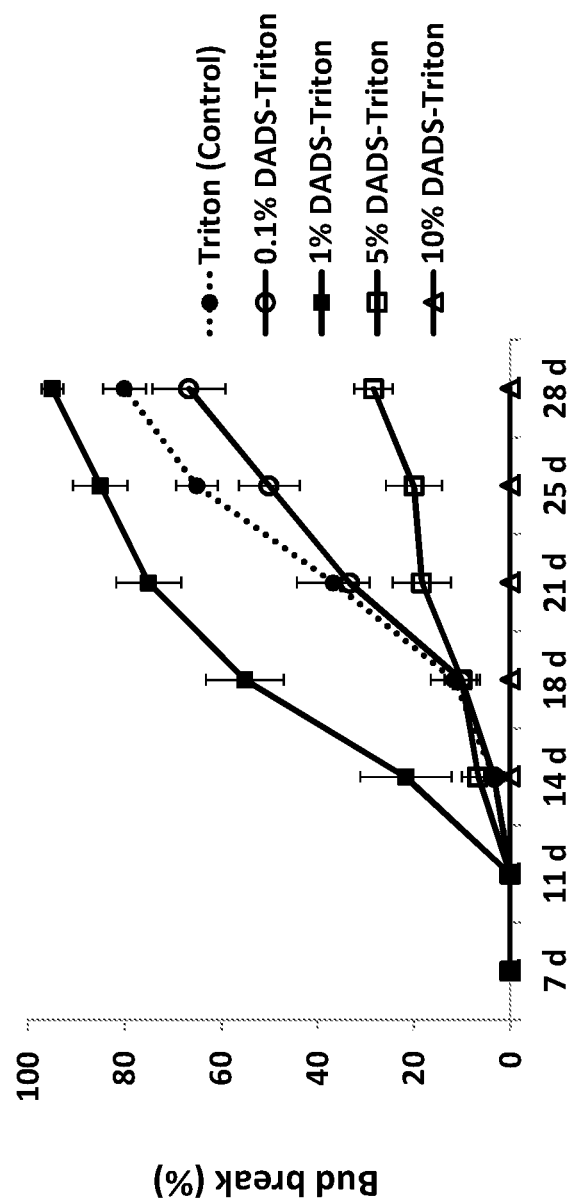
FIG. 1 presents a comparison between the bud break abilities of various concentrations of DADS combined with triton, when applied to grape vine cuttings.

Embodiments of the invention are directed to the combined administration of a penetration or delivery agent and a sulfur containing compound to plants, such as deciduous plants, including grapevines, kiwi and rosacea. According to some embodiments, the combined administration, as detailed herein, is used for enhancing bud break. Further embodiments of the invention are directed to a method for enhancing bud break, wherein the method includes the combined administration of a penetration or delivery agent and a sulfur containing compound. According to some embodiments, the combination is administered to any appropriate part of the plant, including bulbs, tubers, branches, roots, trunk and the like or any combination thereof.

It is noted that throughout this document, the terms penetration agent and delivery agent are interchangeable, unless specifically mentioned otherwise, or unless a person skilled in the art would have known it to be otherwise. Further, as used herein, the terms "combined", "combination" and the like, including terms such as "together with", referring the combined administration of various compounds, are meant to cover any possible combination of the administered materials, including administering two or more materials in a single formulation, administering two or more materials in two or more separate formulations, at the same time, consecutively, at different times, at the same intervals, at different intervals, or any combination thereof. If more than two materials are administered, any of the materials may be combined with any of the other materials, by any of the means detailed above, without being dependent on one another.

For example. Two materials may be included in a single, first, formulation, while a third material is included in a separate, second, formulation and is administered in combination with the first formulation, including the two materials.

Further, as used herein, a penetration or delivery agent is meant to include any agent or adjuvant that is capable of enhancing or improving the uptake of any other material by the plants it is administered to. According to some embodiments, the delivery agent is an amine polymer delivery agent. According to some embodiments, the delivery agent is an alkyl amine polymer. According to some embodiments, the delivery agent is Armobreak® (Armobreak® is an alkoxylated fatty alkylamine polymer, described as having a density of 980 g/L and the formula N, N-Bis-2-(omega-hydroxy polyoxyethylene/polyoxypropylene)ethylalkylamine).

According to some embodiments, the delivery agent is N,N-bis-2-(omega-hydroxypolyoxyethylene/polyoxypropylene) ethyl alkylamine, dialkyldimethyl ammonium polynaphthylmethylene sulfonate, Linoleic diethanolamide, alkylphenol polymerized resin, or any combination thereof.

According to some embodiments, the sulfur containing compound is a sulfide compound. According to some embodiments, the sulfur containing compound is diallyl disulfide (DADS), diallyl monosulfide (DAMS), diallyl trisulfide (DATS), diethyl sulfide, diethyl disulfide, dimethyl monosulfide (DMMS), dimethyl disulfide (DMDS), dimethyl trisulfide (DMTS), triallyl disulfide, sulfur compounds containing allyl, methyl, n-butyl, n-propyl, thiosulfate, thiosulfonate, mercaptan groups, allicin, allyl iso thiocyanate, S-methyl cysteine sulfoxide (SMCSO), dimethyl thiosulfonate, allyl mecaptan, methyl mercaptan and the like, as well as any combination thereof. According to some embodiments, the sulfur containing compounds is naturally found in garlic, Chinese chives and/or Rakkyo, thus, formulations containing garlic, Chinese chives and/or Rakkyo may also be administered as the sulfur containing compound.

According to some embodiments, the combination of the invention is administered by spray or brush. According to some embodiments, the concentration of the sulfur containing compound administered is between about 0.1-6.0%. According to some embodiments, the concentration of the sulfur containing compound administered is between about 0.1-1.0%. According to some embodiments, the concentration of the sulfur containing compound administered is between about 1.0-2.0%. According to some embodiments, the concentration of the sulfur containing compound administered is between about 2.0-3.0%. According to some embodiments, the concentration of the sulfur containing compound administered is between about 3.0-4.0%. According to some embodiments, the concentration of the sulfur containing compound administered is between about 4.0-5.0%. According to some embodiments, the concentration of the sulfur containing compound administered is between about 5.0-6.0%.

According to some embodiments, the concentration of the penetration agent is between about 0.1-6.0%. According to some embodiments, the concentration of the penetration agent is between about 0.1-1.0%. According to some embodiments, the concentration of the penetration agent is between about 1.0-2.0%. According to some embodiments, the concentration of the penetration agent is between about 2.0-3.0%. According to some embodiments, the concentration of the penetration agent is between about 3.0-4.0%. According to some embodiments, the concentration of the penetration agent is between about 4.0-5.0%. According to some embodiments, the concentration of the penetration agent is between about 5.0-6.0%.

In order to better understand how the present invention may be carried out, the following examples are provided, demonstrating a process according to the present disclosure.

EXAMPLES

Example 1

Bud Breaking on Vine Cuttings

Vines of *Vitis vinifera* cv. Early Sweet from a vineyard in Gilgal, located in the Jordan Valley, were pruned to three-node spurs. The detached canes were cut into single-node cuttings, randomly mixed, and groups of 10 cuttings were prepared. Four concentrations of DADS treatments were carried out, each with nine groups of 10 cuttings. The cuttings were sprayed with 0.1%, 1%, 5% and 10% DADS together with 0.02% Triton X-100, as the delivery/wetting agent, wherein the control cuttings were sprayed with only 0.02% Triton X-100. The cuttings were placed in a growth chamber at 22° C. under a 14 h/10 h light/dark regime for 28 days. Bud break was monitored on days 7, 11, 14, 18, 21, 25 and 28 after spraying. The values presented in FIG. 1 are averages of the nine groups in each treatment±SE.

As can be seen in FIG. 1, concentrations of 5% and 10% DADS, and presumably higher concentrations as well, are toxic and actually inhibit bud break. The best result was achieved using 1% DADS.

Example 2

Bud Breaking on Whole Vines in a Vineyard

Mature cv. Early Sweet vines in a commercial vineyard in the Jordan Valley were pruned to three node spurs and sprayed with 2 and 4% DADS, together with 0.02% Triton X-100 as the delivery/wetting agent. The effect of these treatments was compared with that of positive control comprising 5% HC and 0.02% Triton X-100 as well as with a negative control comprising only 0.02% Triton X-100. Each formulation was sprayed onto four blocks of three vines, wherein the values presented in FIG. 2 are an average of the twelve tested grapevines±SE.

Figure 2:
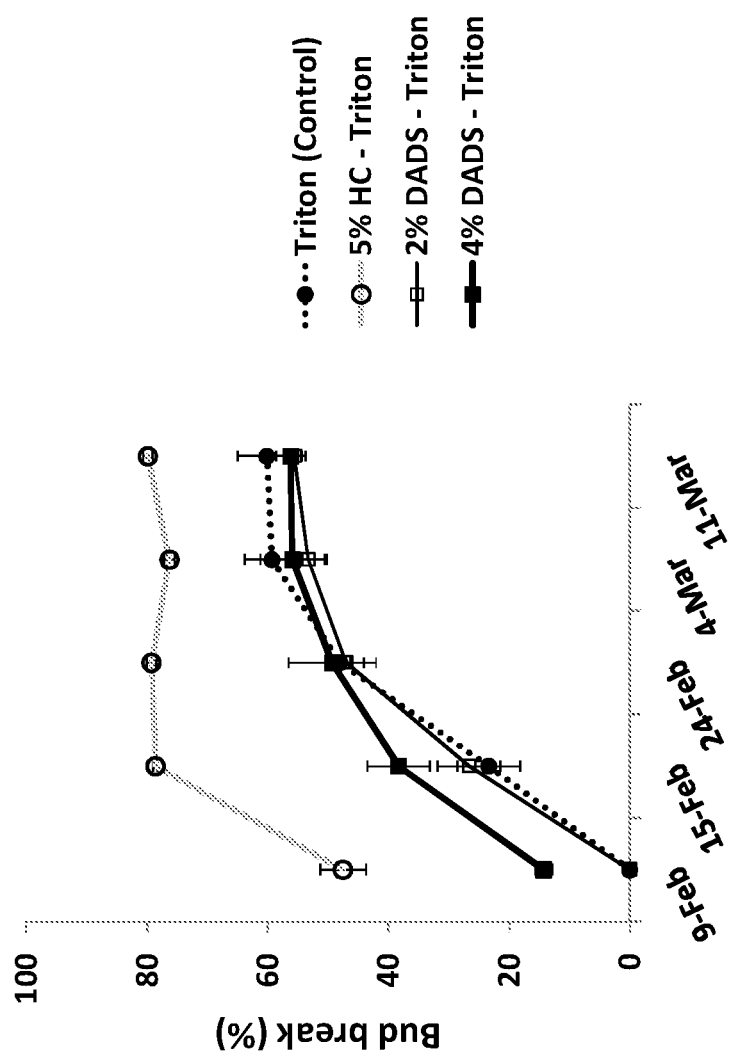
FIG. 2 presents a comparison between the bud breaking ability of various combinations of DADS and triton, HC and triton, and triton alone, when applied to whole vines in a vineyard (spur pruning, hot winter)

According to the results, as presented in FIG. 2, 2% DADS had no effect in a commercial vineyard, i.e., on whole plants, rather than on cuttings as presented in Example 1. Thus, as shown in FIG. 2, the 2% DADS provides results essentially identical to those of the negative control, while application of 4% DADS leads to a slight enhancement in bud break in comparison to the negative control; however, that enhancement is very limited in comparison to the positive HC control. Thus, in this example the overall effect of the DADS treatments was almost the same as that of the negative control and further, was far less effective than the HC control. When comparing these results to the results of Example 1, it appears as though there is a significant difference when treating cuttings and when treating whole vines. Accordingly, no results relevant to cuttings may be considered to be relevant to whole vines; rather, each and every type of treatment must be tested and formulated separately for whole vines, since success on cuttings does not promise even partial success in a vineyard.

Example 3

Delivery Agent Addition

In view of the above, the improved delivery of DADS, as well as other sulfur containing compounds was tested on whole vines in a vineyard, wherein the sulfur containing compounds were administered together with a delivery agent.

Figure 3:
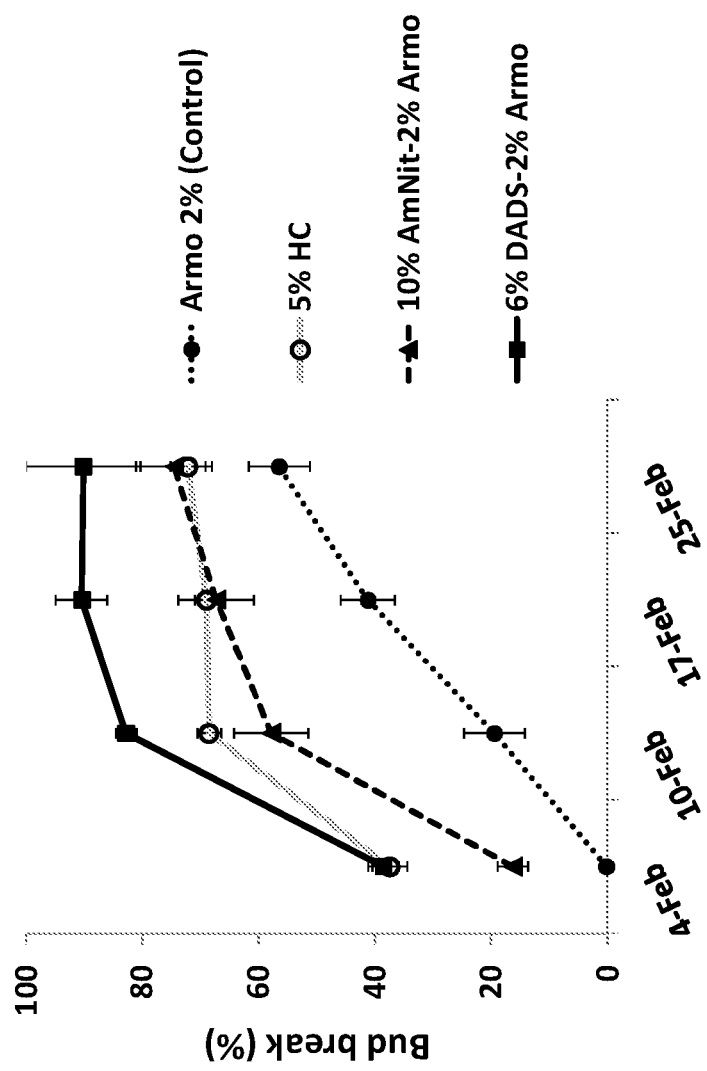
FIG. 3 presents a comparison between the bud breaking ability of combinations of Armobreak®/DADS and Armobreak®/Ammonium Nitrate, as well as Armobreak® and HC controls, when applied to a whole vine (Spur pruning, hot winter)

The vines were pruned to three-node spurs and sprayed with 0.02% Triton (negative control) or with 0.02% Triton+ 5% HC (positive control, marked in FIG. 3 as "HC"). Additional vines were sprayed with 2% Armobreak® and 10% ammonium nitrate (marked in FIG. 3 as "10% AmNit/ Armo") or with 2% Armobreak® and 6% DADS (marked in FIG. 3 as "6% DADS/Armo"). These treatments were conducted at 15 January. The experiment was conducted as described in Example 2 and bud break was monitored in the field at 4 February, 10 February, 17 February and 25 February.

As shown in FIG. 3, the treatment with 6% DADS+2% Armobreak® not only enhances bud break when compared to the negative control, but also when compared to HC, which is known to be the best bud breaking agent in the field. The effect of Ammonium nitrate (AmNit), another stimulus of bud break, was inferior despite its application with 2% Armobreak®

Figure 4:
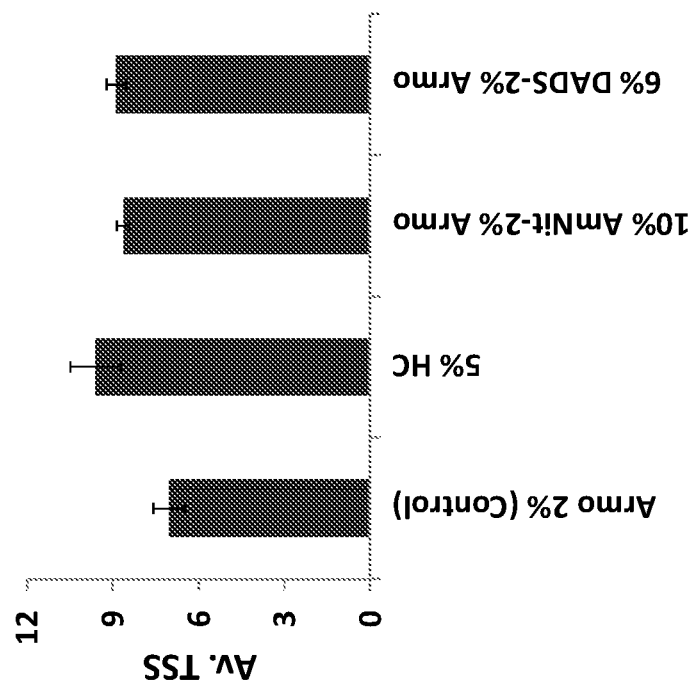
FIG. 4 presents a comparison of the sugar level in berries from vines treated with combinations of Armobreak®/DADS and Armobreak®/Ammonium Nitrate, as well as Armobreak® and HC controls.

The promising combination of Armobreak® and DADS was further tested, and was shown to advance ripening, similarly to HC, as indicated the TSS levels of the berries presented in FIG. 4. Further, the Armobreak® and DADS combination was shown to have no significant effect on fertility, as measured by the average number of clusters/buds, as presented in FIG. 5.

Particularly, five clusters of each grapevine were randomly selected and ten berries of each cluster were mashed with a mortar and pestle. The TSS values of the mash were tested by using Brix Meters. The values presented in FIG. 4 are averages of five repeats for the twelve grapevine in the four blocks in each treatment±SE. As shown in FIG. 4, DADS and other dormancy release stimulants increase the total soluble solids (TSS) level of the berries in comparison to the control.

Figure 5:
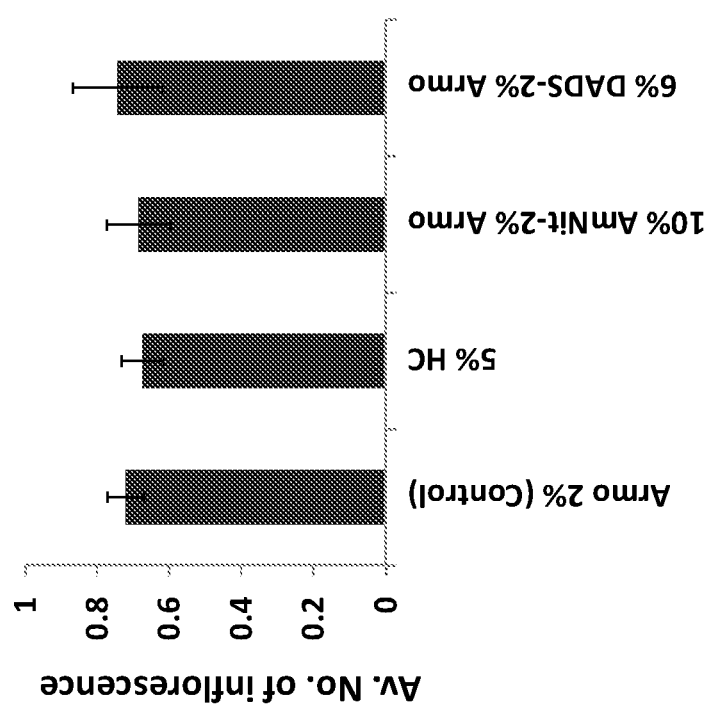
FIG. 5 presents the average number of inflorescence of various vines, treated with combinations of Armobreak®/DADS and Armobreak®/Ammonium Nitrate, as well as Armobreak® and HC controls.

Further, FIG. 5 presents the average number of inflorescence/bud in different treatments. The total inflorescence number of each grapevine was counted and compared with the related total buds number. The values presented in FIG. 5 are an average of the twelve grapevines in the four blocks in each treatment±SE.

Example 4

Sole Application of Armobreak®

Figure 6:
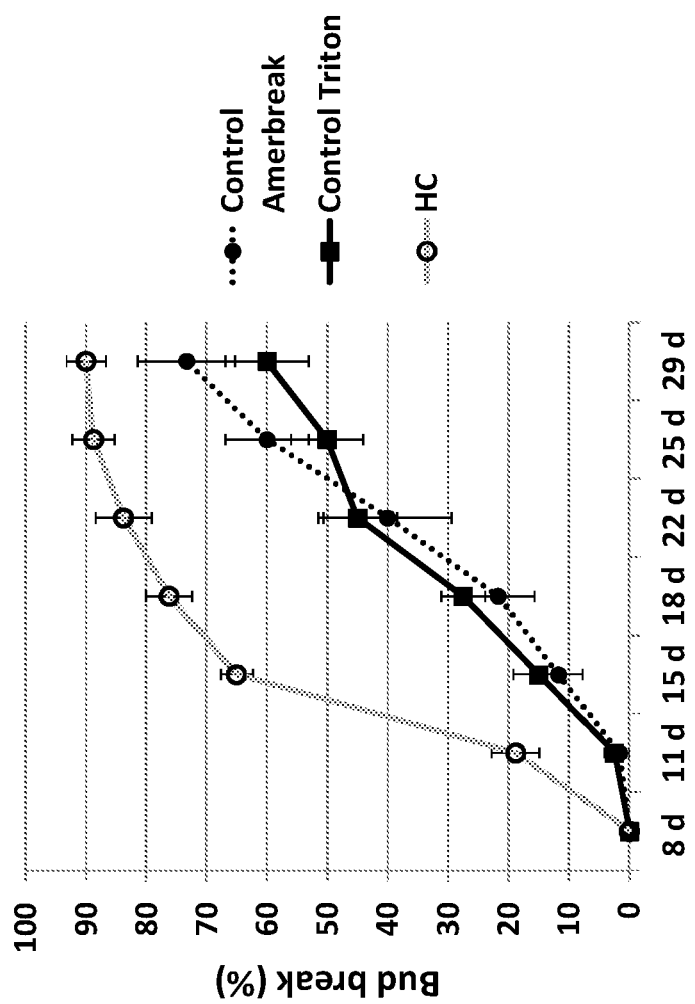
FIG. 6 presents a comparison between the bud break obtained from Armobreak®, triton and HC formulations, when applied to cuttings from a vineyard in the Jordan valley.

Vines of *Vitis vinifera* cv. Early Sweet from a vineyard in Gilgal, located in the Jordan Valley, were pruned to three-node spurs. The detached canes were cut into single-node cuttings, randomly mixed, and groups of 10 cuttings were prepared. Armobreak® (2%) and commercial surfactant Triton X-100 (0.02%) treatments were applied. These materials were compared with the application of HC+Triton X-100 (0.02%). All experimental details are as described in Example 1. As shown in FIG. 6, Armobreak® itself does not induce dormancy release, thus, the results shown in FIGS. 3-5 and detailed in Example 3, stem from the novel combination of Armobreak® and DADS.

Example 5

Combined Application of Armobreak® and Various Concentrations of Diallyl Sulfide (DAS)

Figure 7:
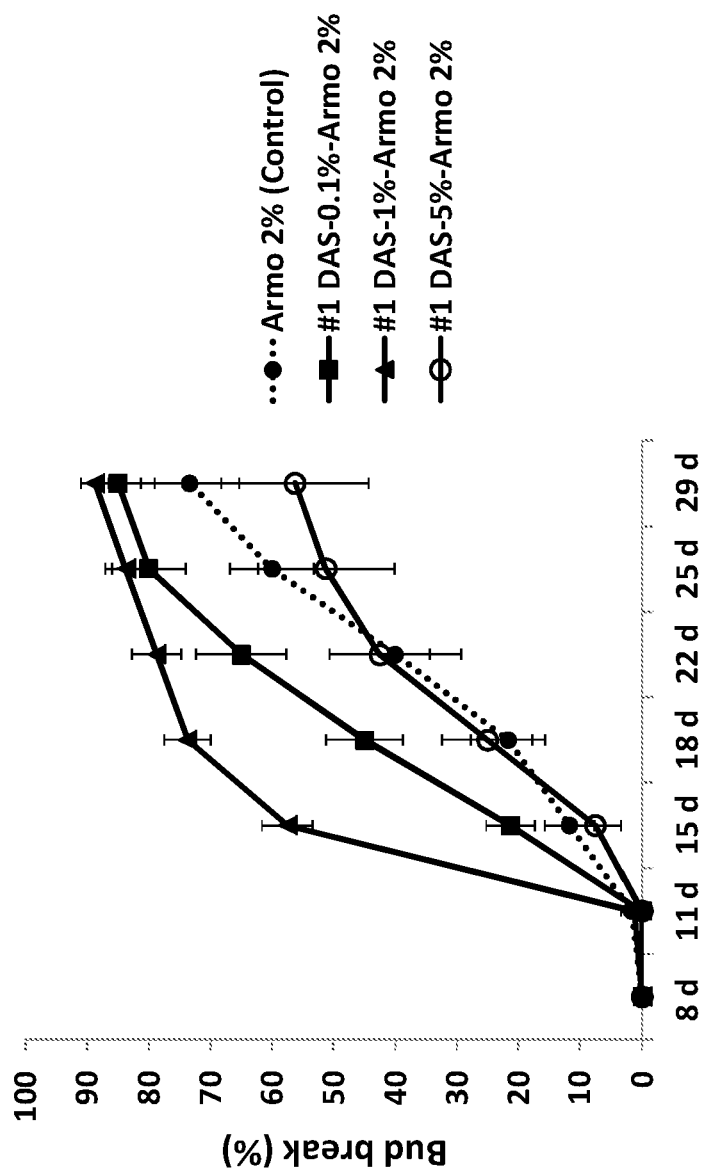
FIG. 7 presents a comparison between the bud break obtained from various Armobreak® and DAS formulations applied to early sweet grape vine cuttings.

CV. Early Sweet grapevine single node cuttings were prepared as described in Example 1 and treated with a control comprising 2% Armobreak® or with 2% Armobreak® combined with (a) 0.1% DAS (appearing in FIG. 7 as "DAS 0.1%-Armo 2%"); (b) 1% DAS (appearing in FIG. 7 as "DAS 1%-Armo 2%); or (c) 5% DAS (appearing in FIG. 7 as "DAS 5%-Armo 2%:). All of the experimental details are as described in Example 1. As shown in FIG. 7, relatively low concentrations of DAS applied together with Armobreak® enhance bud breaking in grapevine cuttings, while higher concentrations of DAS may reduce bud breaking.

Example 6

Combined Application of Armobreak® and Diallyl Trisulfide (DATS) or DADS

Figure 8:
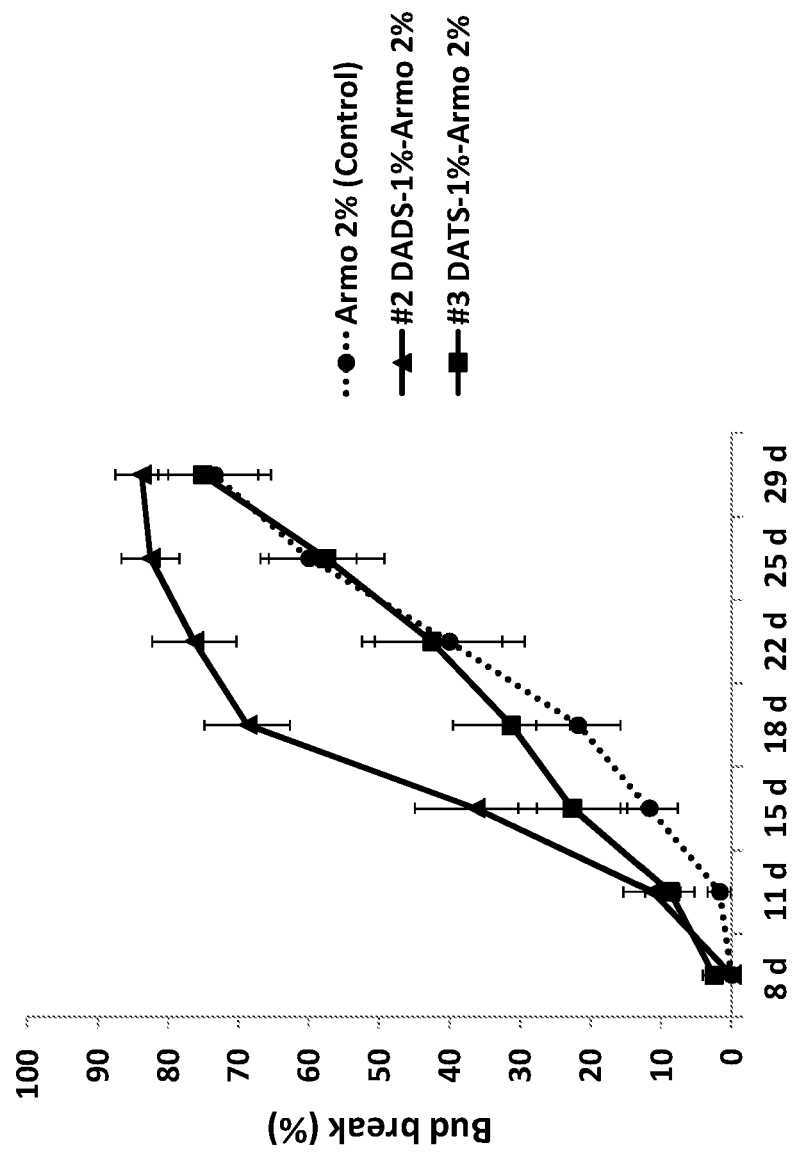
FIG. 8 presents a comparison between the bud break obtained from various Armobreak®, DADS and DATS formulations applied to early sweet grape vine cuttings.

CV. Early Sweet grapevine single node cuttings were prepared as described in Example 1 and treated with a control comprising 2% Armobreak® or with 2% Armobreak® combined with (a) 1% DATS (appearing in FIG. 8 as "DATS 1%-Armo 2%"); or (b) 1% DADS (appearing in FIG. 8 as "DADS 1%-Armo 2%"). All of the experimental details are as described in Example 1. As shown in FIG. 8, while 1% of DADS+2% Armobreak® remarkably increase bud break in cuttings, the 1% DATS+Armobreak® has a very limited effect, compared to the control.

Example 7

Combined Application of Armobreak® and Various Concentrations of Diethyl Sulfide (DES)

Figure 9:
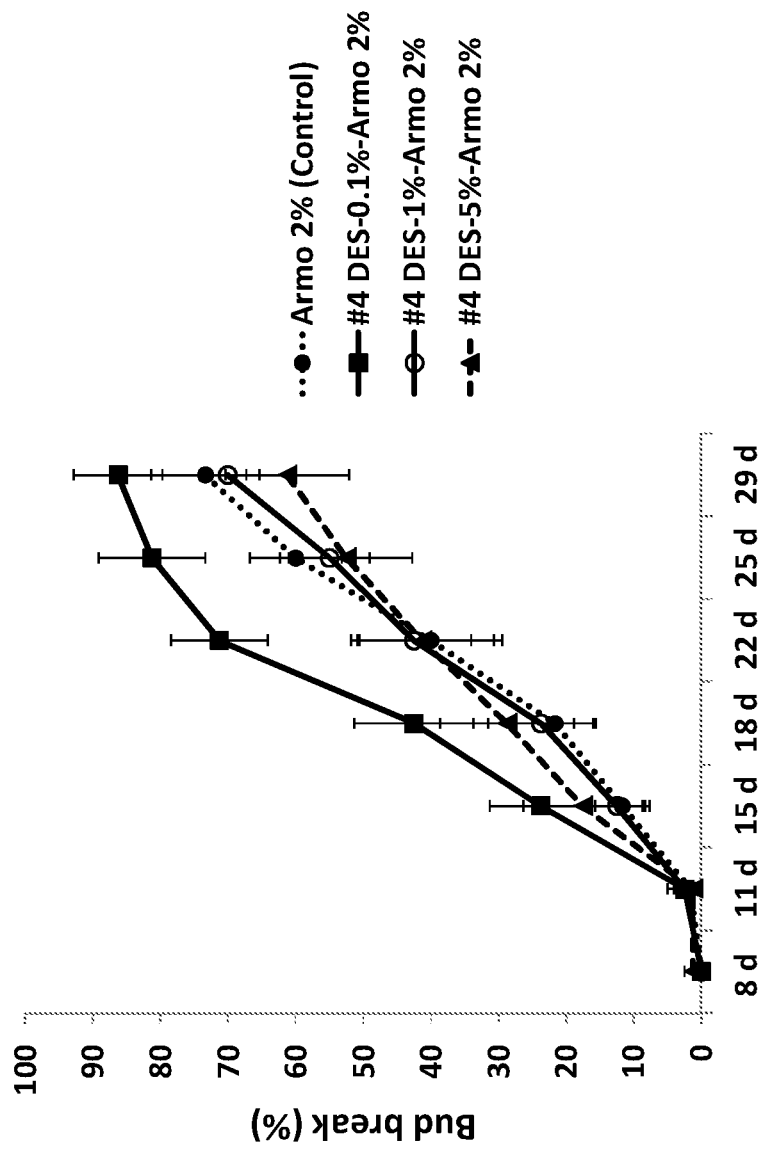
FIG. 9 presents a comparison between the bud break obtained from various Armobreak® and DES formulations applied to early sweet grape vine cuttings.

CV. Early Sweet grapevine single node cuttings were prepared as described in Example 1 and treated with a control comprising 2% Armobreak® or with 2% Armobreak® combined with (a) 0.1% DES (appearing in FIG. 9 as "DES 0.1%-Armo 2%"); (b) 1% DES (appearing in FIG. 9 as "DES 1%-Armo 2%"); or (c) 5% DES (appearing in FIG. 9 as "DES 5%-Armo 2%"). All of the experimental details are as described in Example 1. As shown in FIG. 9, while low (0.1%) concentrations of DES+2% Armobreak® enhance bud breaking in comparison to the control, higher (1.0% and 5.0%) concentrations combined with 2% Armobreak® provide results similar to the control.

Example 8

Combined Application of Armobreak® and Various Concentrations of Diethyl Disulfide (DEDS)

Figure 10:
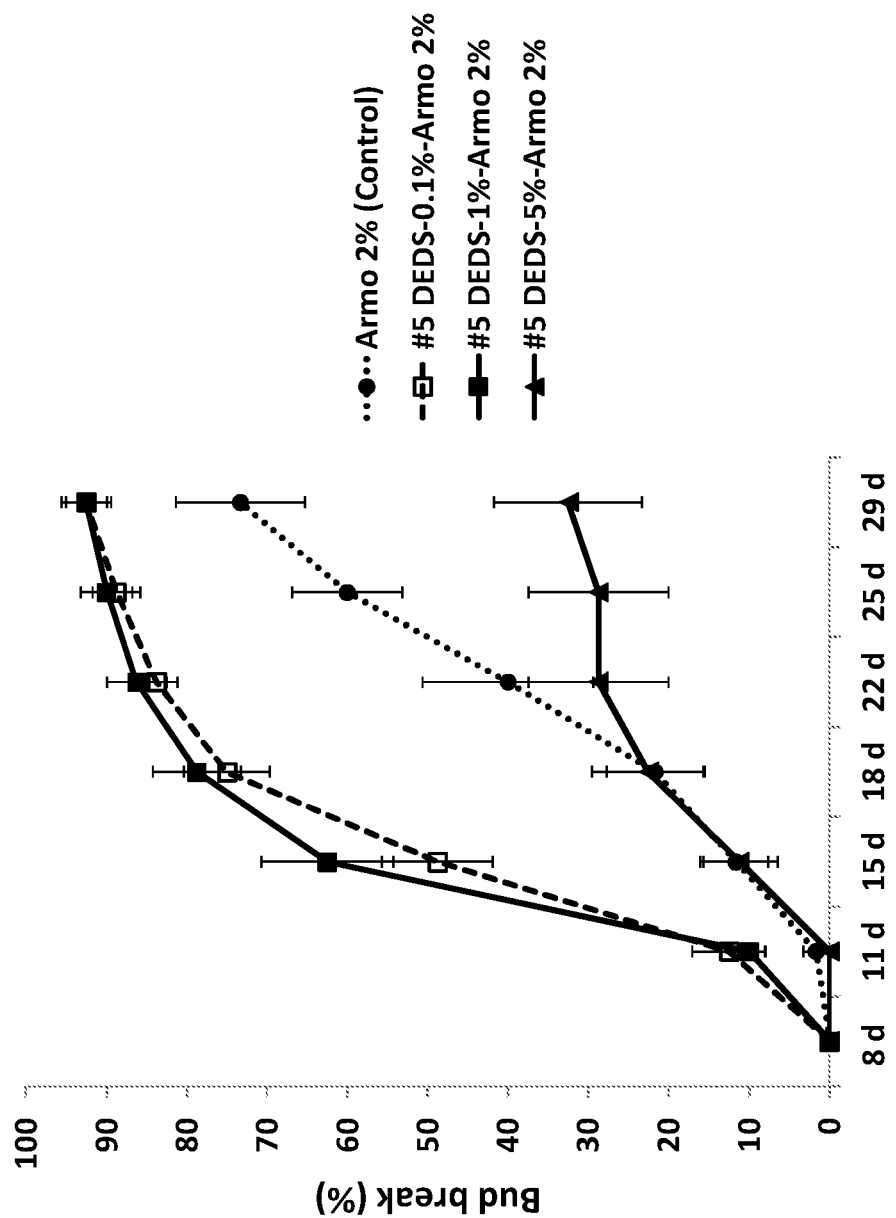
FIG. 10 presents a comparison between the bud break obtained from various Armobreak® and DEDS formulations applied to early sweet grape vine cuttings.

CV. Early Sweet grapevine single node cuttings were prepared as described in Example 1 and treated with a control comprising 2% Armobreak® or with 2% Armobreak® combined with (a) 0.1% DEDS (appearing in FIG. 10 as "DEDS 0.1%-Armo 2%"); (b) 1% DEDS (appearing in FIG. 10 as "DEDS 1%-Armo 2%"); or (c) 5% DEDS (appearing in FIG. 10 as "DEDS 5%-Armo 2%"). All of the experimental details are as described in Example 1. As shown in FIG. 10, while low (0.1% and 1.0%) concentrations of DEDS+2% Armobreak® enhance bud breaking in comparison to the control, high (5%) concentrations combined with 2% Armobreak® may even inhibit bud break.

Example 9

Combined Application of Armobreak® and Various Concentrations of Dimethyl Sulfide (DMS)

Figure 11:
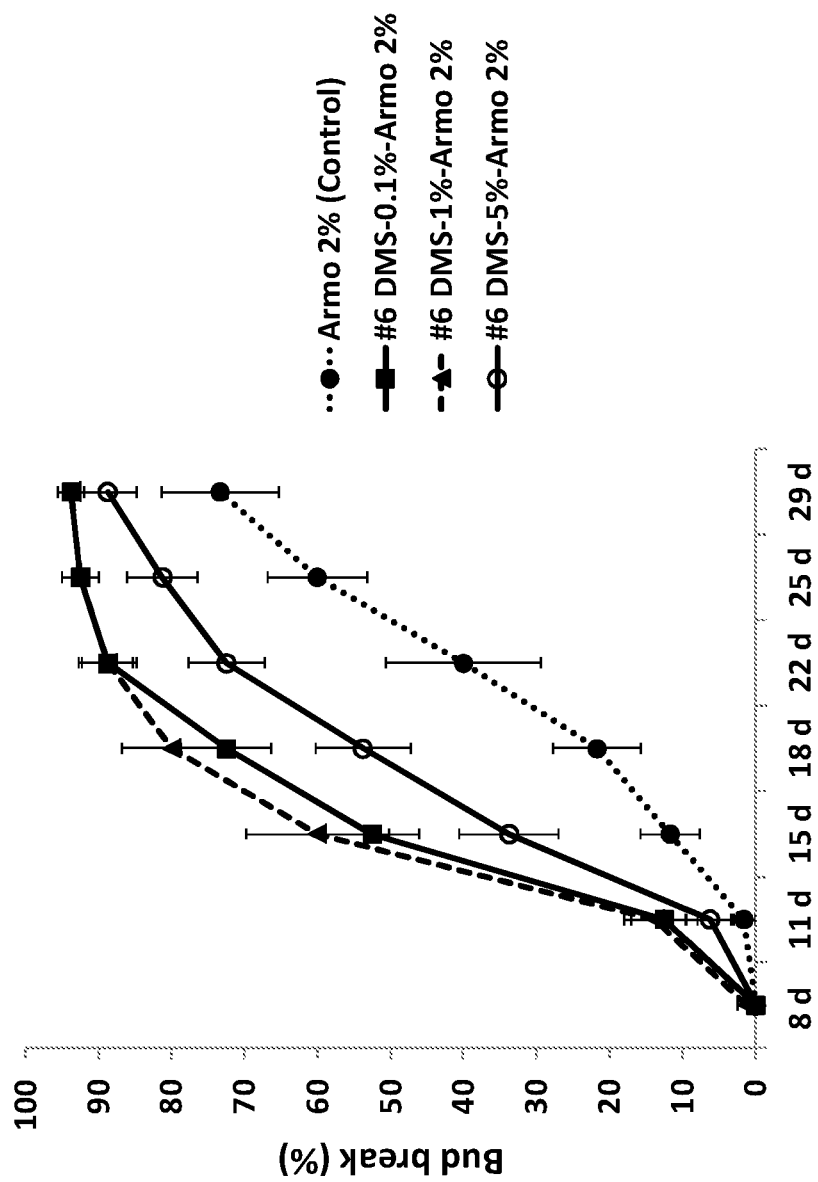
FIG. 11 presents a comparison between the bud break obtained from various Armobreak® and DMS formulations applied to early sweet grape vine cuttings.

CV. Early Sweet grapevine single node cuttings were prepared as described in Example 1 and treated with a control comprising 2% Armobreak® or with 2% Armobreak® combined with (a) 0.1% DMS (appearing in FIG. 11 as "DMS 0.1%-Armo 2%"); (b) 1% DMS (appearing in FIG. 11 as "DMS 1%-Armo 2%"); or (c) 5% DMS (appearing in FIG. 11 as "DMS 5%-Armo 2%"). All of the experimental details are as described in Example 1. As shown in FIG. 11, all concentrations of DMS used together with 2% Armobreak® enhance bud breaking in comparison to the control; however, the enhancement provided by the 0.1% and 1.0% DMS formulations is higher than that provided by the 5% DMS formulation.

Example 10

Combined Application of Armobreak® and Various Concentrations of Dimethyl Trisulfide (DMTS)

Figure 12:
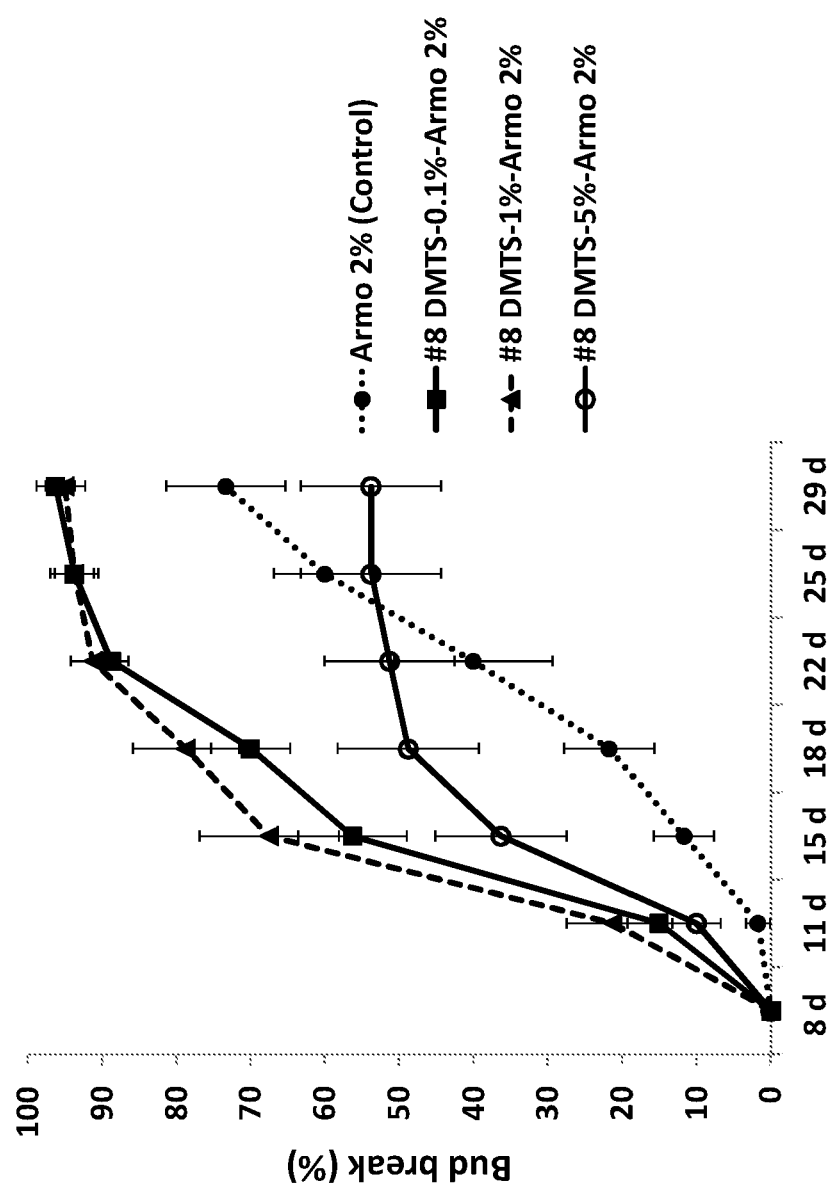
FIG. 12 presents a comparison between the bud break obtained from various Armobreak® and DMTS formulations applied to early sweet grape vine cuttings.

CV. Early Sweet grapevine single node cuttings were prepared as described in Example 1 and treated with a control comprising 2% Armobreak® or with 2% Armobreak® combined with (a) 0.1% DMTS (appearing in FIG. 12 as "DMTS 0.1%-Armo 2%"); (b) 1% DMTS (appearing in FIG. 12 as "DMTS 1%-Armo 2%"); or (c) 5% DMTS (appearing in FIG. 12 as "DMTS 5%-Armo 2%"). All of the experimental details are as described in Example 1. As shown in FIG. 12, while low (0.1% and 1.0%) concentrations of DMTS+2% Armobreak® enhance bud breaking in comparison to the control, high (5%) concentrations combined with 2% Armobreak® may even inhibit bud break.

Example 11

Figure 13:
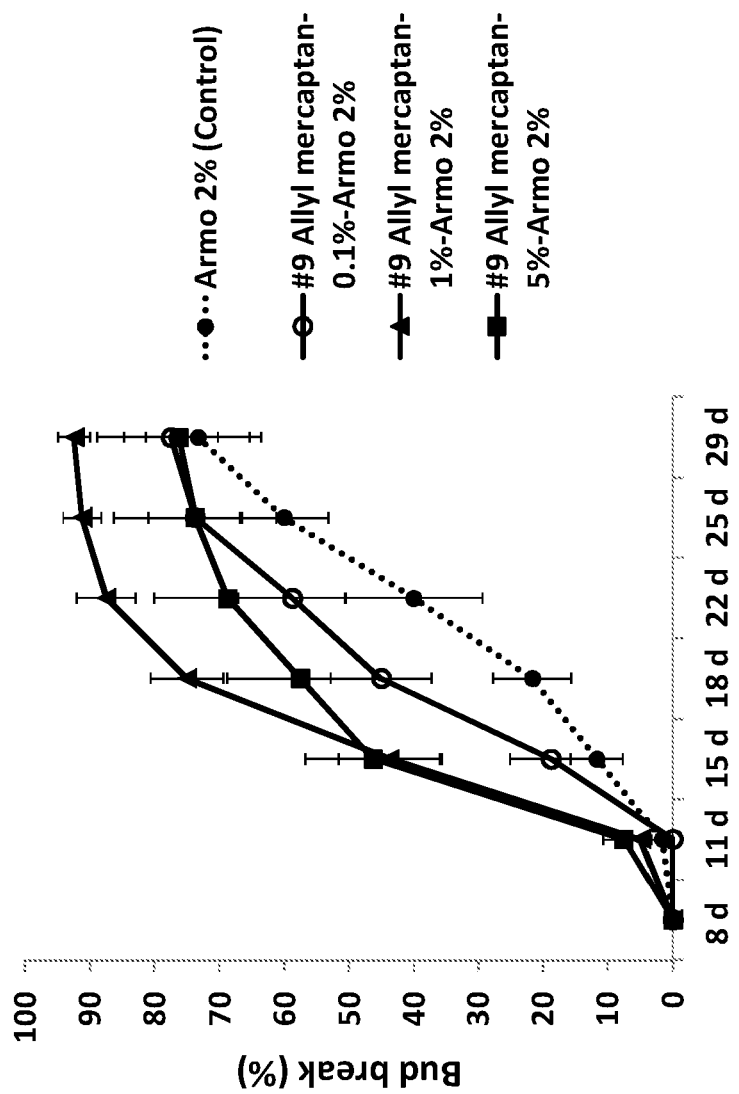
FIG. 13 presents a comparison between the bud break obtained from various Armobreak® and allyl mercaptan formulations applied to early sweet grape vine cuttings.

Combined Application of Armobreak® and Various Concentrations of Allyl Mercaptan CV. Early Sweet grapevine single node cuttings were prepared as described in Example 1 and treated with a control comprising 2% Armobreak® or with 2% Armobreak® combined with (a) 0.1% allyl mercaptan (appearing in FIG. 13 as "allyl mercaptan 0.1%"); (b) 1% allyl mercaptan (appearing in FIG. 13 as "allyl mercaptan 1%"); or (c) 5% allyl mercaptan (appearing in FIG. 13 as "allyl mercaptan 5%"). All of the experimental details are as described in Example 1. As shown in FIG. 13, all concentrations of allyl mercaptan used together with 2% Armobreak® enhance bud breaking in comparison to the control; however, the enhancement provided by the 1.0% allyl mercaptan formulation is higher than that provided by either the 0.1% or the 5% allyl mercaptan formulations.

Example 12

Combined Application of Armobreak® and DADS on Peach Cuttings

Figure 14:
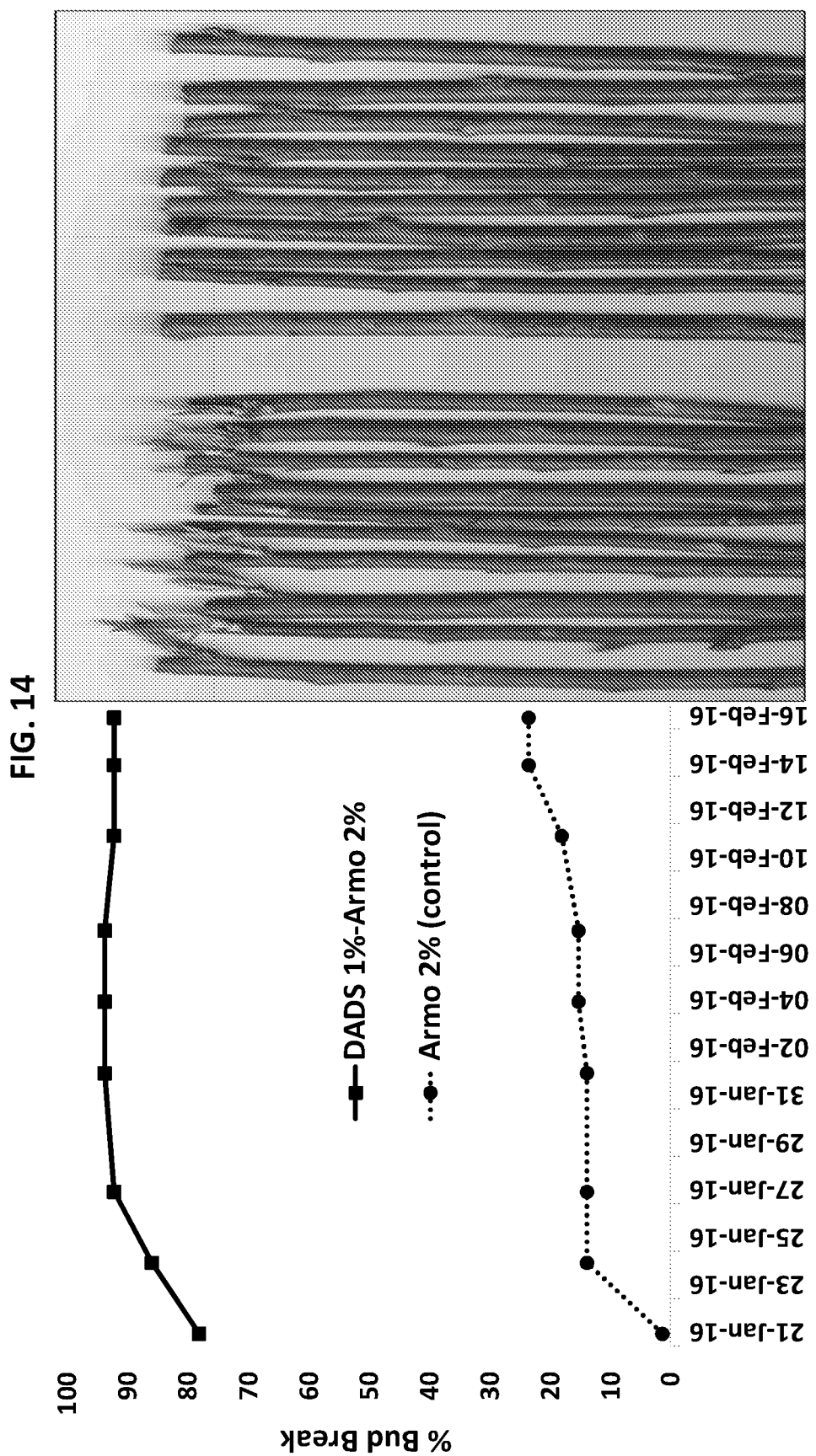
FIG. 14 presents a comparison between the bud break obtained from Armobreak® and DADS formulations applied to peach cuttings.

Cv. Summer Snow woody peach shoots were used to prepare one bud cuttings by removing additional buds. The cuttings were treated with a control comprising 2% Armobreak® or with 2% Armobreak® combined with 1% DADS (appearing in FIG. 14 as "DADS 1%-Armo 2%"). The experiment was conducted as detailed in Example 1 and bud break was monitored on days 14, 17, 20, 25 and 28 after treatment. As shown in FIG. 14, the use of a combination of 1% DADS+2% Armobreak® highly enhances bud break in comparison to the 2% Armobreak® control.

Example 13

Combined Application of Armobreak® and DADS on Apple Cuttings

Figure 15:
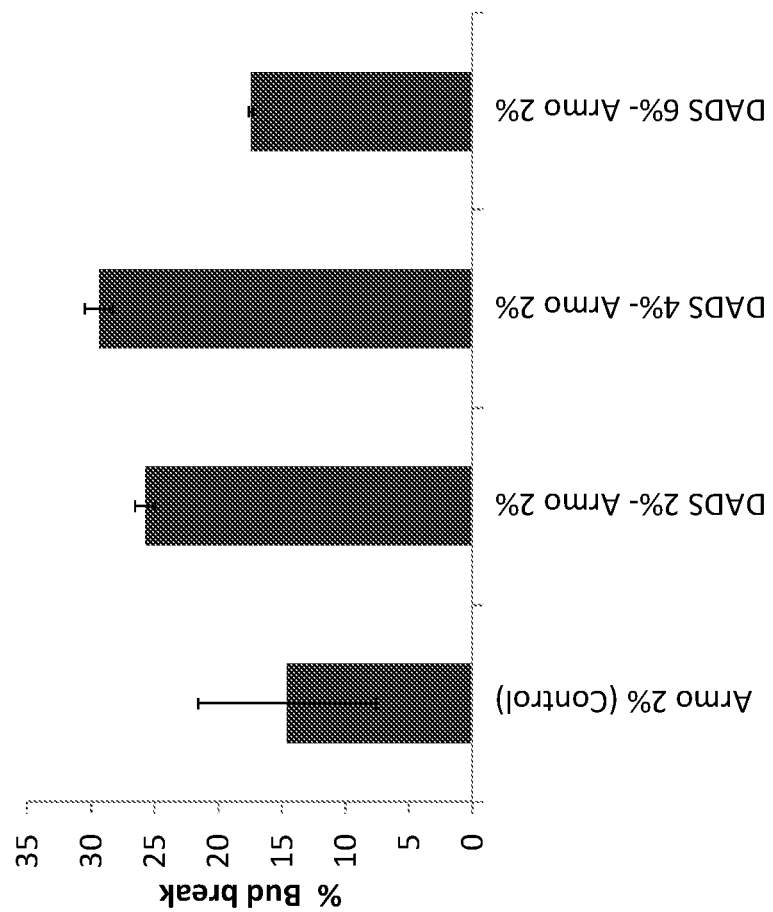
FIG. 15 presents a comparison between the bud break obtained from various Armobreak® and DADS formulations applied to apple trees.

Cv. Golden Delicious apple shoots on trees grown in Malkia, were treated with a control comprising 2% Armobreak® or with 2% Armobreak® combined with (a) 2% DADS (appearing in FIG. 15 as "DADS 2%-Armo 2%"); (b) 4% DADS (appearing in FIG. 15 as "DADS 4%-Armo 2%"); or (c) 6% DADS (appearing in FIG. 15 as "DADS 5%-Armo 2%"). All of the experimental details are as described in Example 2. As shown in FIG. 15, while the 2% and 4% concentrations of DADS+2% Armobreak® enhance bud breaking in comparison to the control, the 6% concentration of DADS combined with 2% Armobreak® provides results similar to the control.

Example 14

Combined Application of Armobreak® and DADS/DMTS on Whole Vines

Cv. Early Sweet vines grown in a greenhouse in Binyamina at the northern costal plan of Israel were pruned very early in the dormancy cycle, on Dec. 1, 2015, to 3 node spurs. It is noted that, generally, treatments early in the dormancy cycle tend to be less effective since bud break enhancing is difficult early in the dormancy cycle.

Figure 16A:
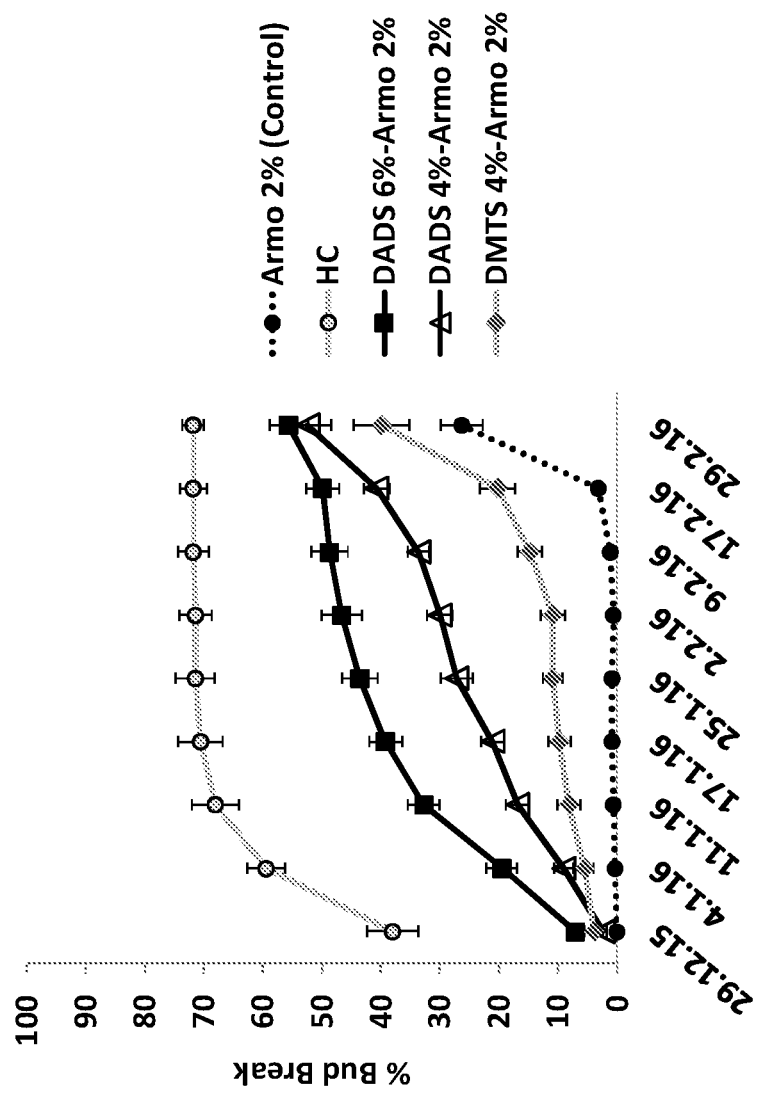
FIG. 16A presents a comparison between the bud break obtained from various Armobreak®, HC, DADS and DMTS formulations applied to whole vines located in Binyamina, Israel (spur pruning, greenhouse)
Figure 16B:
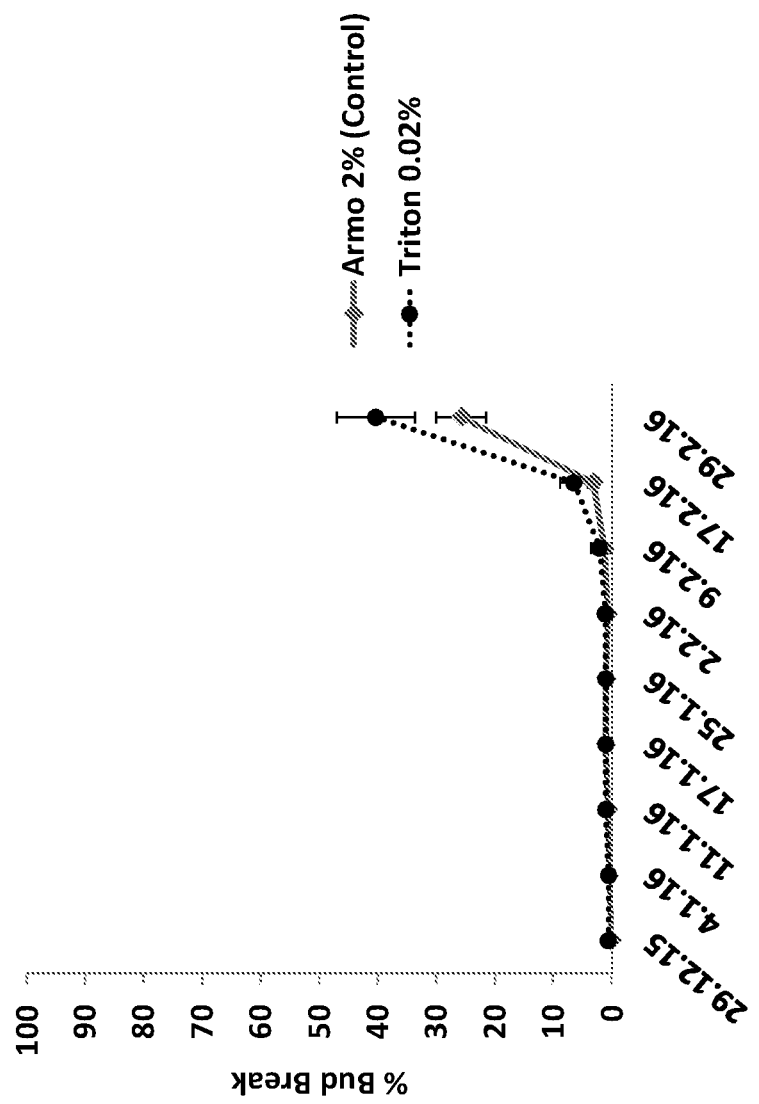
FIG. 16B presents a comparison between the bud break obtained from Armobreak® and triton control formulations applied to whole vines located in Binyamina, Israel (spur pruning, greenhouse)

The vines were sprayed with: (a) 0.025% Triton (functioning as a negative triton control); (b) 5% HC combined with 0.02% triton (functioning as a positive control); (c) 2% Armobreak (appearing in FIG. 16A as "Armo 2% control"); or with 2% Armobreak® combined with: (d) 4% DADS (appearing in FIG. 16A as "DADS 4%-Armo 2%"); (e) 6% DADS (appearing in FIG. 16A as "DADS 6%-Armo 2%"); or (f) 4% DMTS (appearing in FIG. 16A as "DMTS 4%-Armo 2%"). All of the experimental details are as described in Example 2. As shown in FIG. 16A, all of the DADS/DMTS Armobreak® combinations enhance bud break, though none as efficiently as the HC positive control. Further, as shown in FIG. 16B, neither one of the negative controls, i.e., triton alone or Armobreak® alone, provides bud break enhancement.

Example 15

Figure 17:
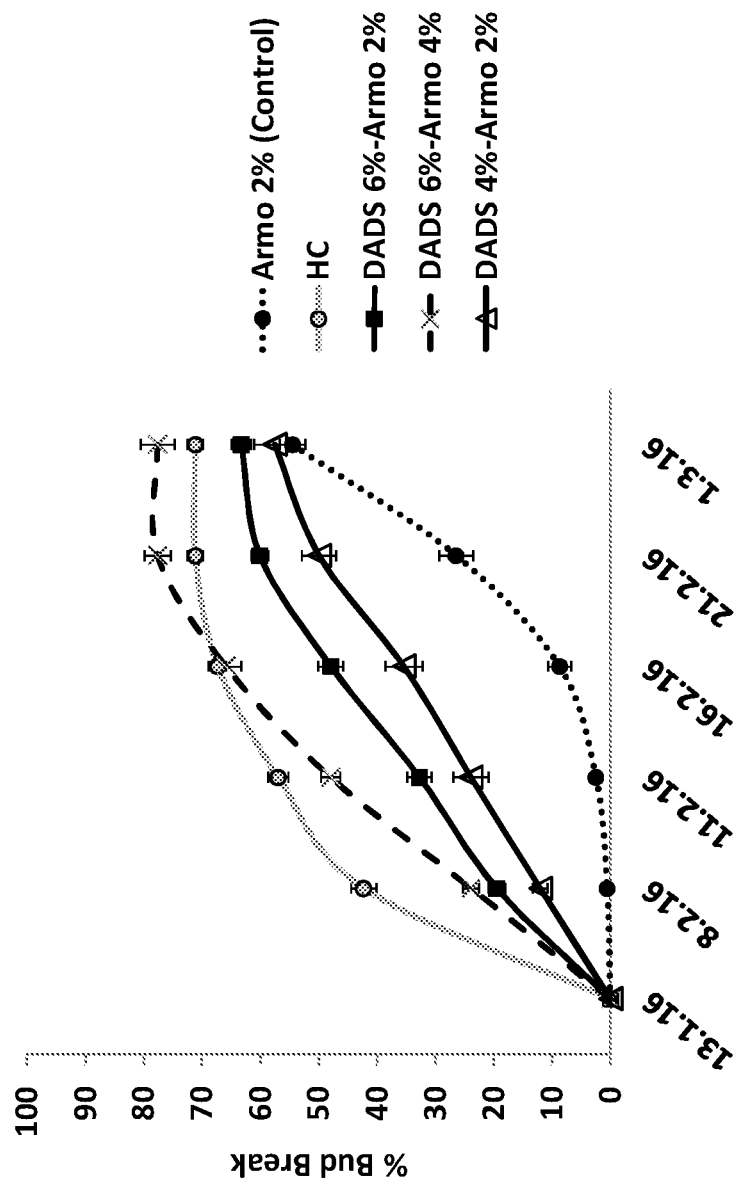
FIG. 17 presents a comparison between the bud break obtained from various Armobreak®, HC and DADS formulations applied to whole vines located in the Jordan Valley, Israel (spur pruning, hot winter)

Combined Application of Armobreak® and Various Concentrations of DADS on Whole Vines Cv. Early Sweet vines in the Jordan Valley were pruned to three-node spurs and sprayed with 5% HC combined with 0.02% triton (HC positive control), with a negative control comprising 2% Armobreak® or with 2% Armobreak® combined with (a) 4% DADS (appearing in FIG. 17 as "DADS 4%-Armo 2%"); or (b) 6% DADS (appearing in FIG. 17 as "DADS 6%-Armo 2%"). Additional vines were sprayed with a combination of 4% Armobreak and 6% DADS (appearing in FIG. 17 as "DADS 6%-Armo 4%"). All of the experimental details are as described in Example 2. As shown in FIG. 17, all of the combinations of DADS and Armobreak® enhanced bud break in comparison to the negative control, wherein the 6% DADS+4% Armobreak® formulation was even more efficient in bud break enhancement than HC, the positive control.

Example 16

Combined Application of Armobreak® and DADS/DMS on Whole Vines

Figure 18:
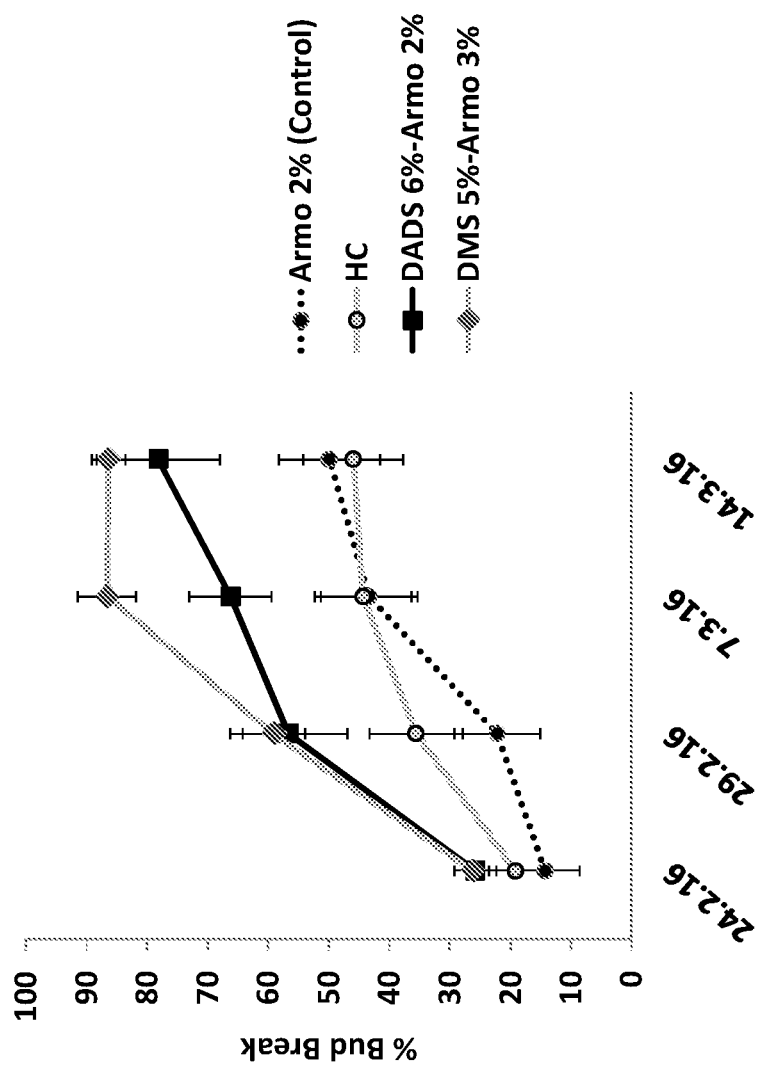
FIG. 18 presents a comparison between the bud break obtained from various Armobreak®, HC, DADS and DMS formulations applied to whole vines located in Zichron Ya'akov, Israel (can pruning, moderate winter)

The carrying canes of Cv. Early Sweet vines, grown in Zichron Ya'akov, on the northern coastal plain of Israel (a region with a moderate, rather than a hot, winter), were pruned to 10 nodes and were sprayed with 5% HC combined with 0.02% triton (HC positive control); with a negative control comprising 2% Armobreak®, with 2% Armobreak® combined with 6% DADS (appearing in FIG. 18 as "DADS 6%-Armo 2%"); or with 3% Armobreak® combined with 5% DMS (appearing in FIG. 18 as "DMS 5%-Armo 3%"). All of the experimental details are as described in Example 2. As shown in FIG. 18, both the combination of DADS and Armobreak® as well as the combination of DMS and Armobreak® enhances bud break, both in comparison to the negative control and in comparison to HC, the positive control.

Example 17

Combined Application of Armobreak® and DADS/DMS on Whole Vines

Figure 19:
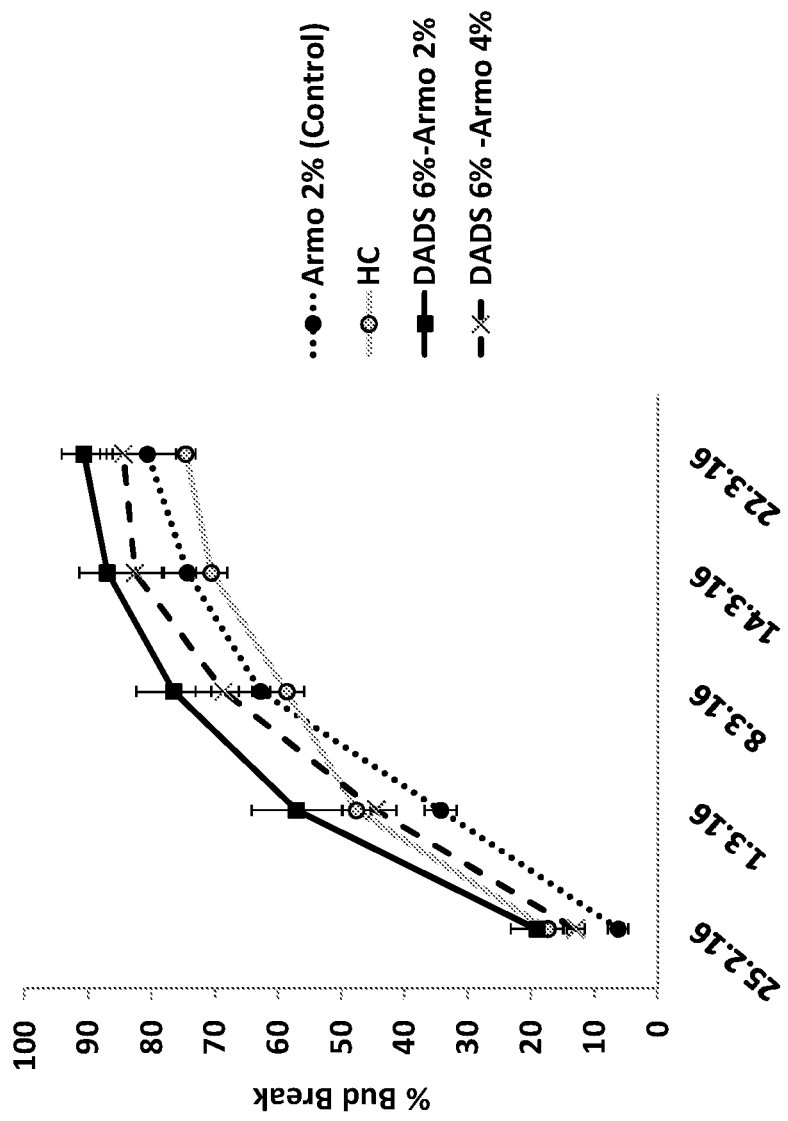
FIG. 19 presents a comparison between the bud break obtained from various Armobreak®, HC and DADS formulations applied to whole vines located in Pedaya, Israel (spur pruning, moderate winter)

Cv. Flame vines in Pedaya, found in the central coastal plain of Israel, presenting a moderate, rather than hot, winter, were pruned to three-node spurs and sprayed with 5% HC combined with 0.02% triton (HC positive control); with a negative control comprising 2% Armobreak®, with 2% Armobreak® combined with 6% DADS (appearing in FIG. 19 as "DADS 6%-Armo 2%"); or with 4% Armobreak® combined with 6% DADS (appearing in FIG. 19 as "DADS 6%-Armo 4%"). All of the experimental details are as described in Example 2. As shown in FIG. 19, both DADS formulations presents a bud break slightly higher than that of either the positive or the negative control.

Example 18

Combined Application of Armobreak® and DADS/DES on Whole Vines

Figure 20:
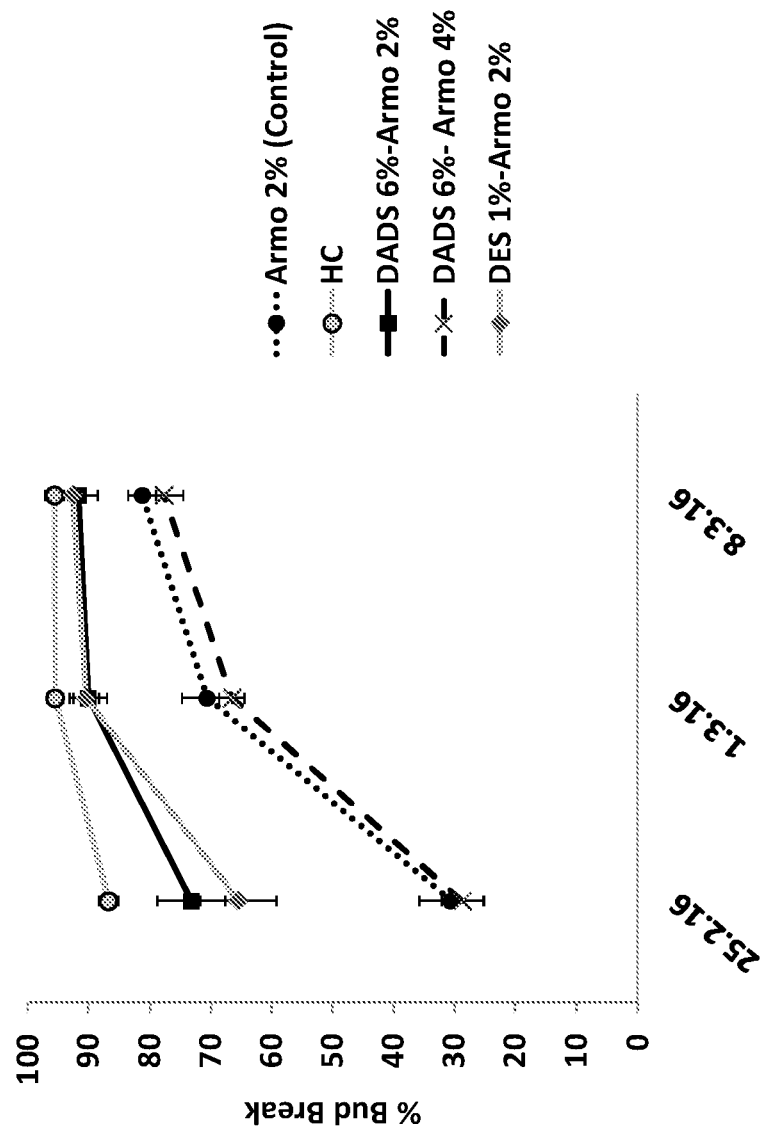
FIG. 20 presents a comparison between the bud break obtained from various Armobreak®, HC, DADS and DES formulations applied to whole vines located in Pedaya, Israel (cane pruning, moderate winter)

Cv. Superior vines grown in Pedaya were pruned to 10-node canes and were sprayed with 5% HC combined with 0.02% triton (HC positive control); with a negative control comprising 2% Armobreak®, with 2% Armobreak® combined with 6% DADS (appearing in FIG. 20 as "DADS 6%-Armo 2%"); with 4% Armobreak® combined with 6% DADS (appearing in FIG. 20 as "DADS 6%-Armo 4%"); or with 2% Armobreak® combined with 1% DES (appearing in FIG. 20 as "DES 1%-Armo 2%"). All of the experimental details are as described in Example 2. As shown in FIG. 20, 6% DADS+2% Armobreak® and 1% DES+2% Armobreak® enhance bud break about as well as the HC positive control, while the 6% DADS+4% Armobreak® formulation provides results similar to those of the negative control.

Example 19

Figure 21:
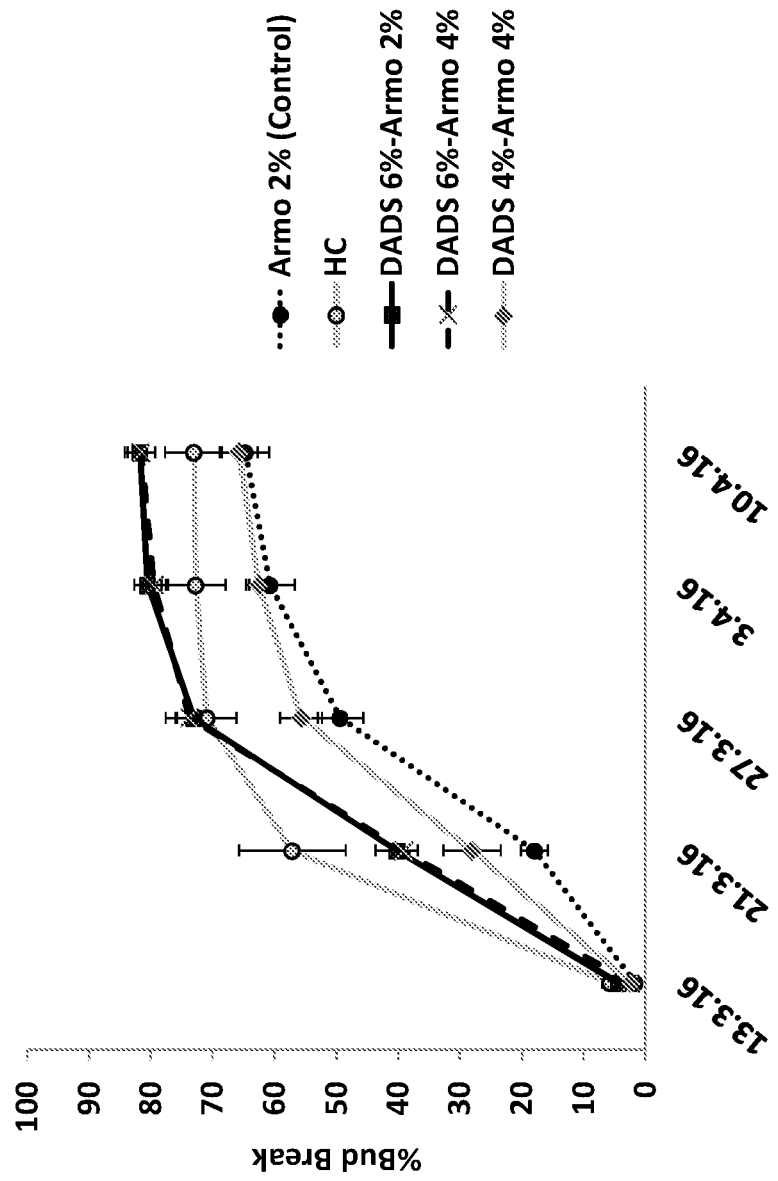
FIG. 21 presents a comparison between the bud break obtained from various Armobreak®, HC and DADS formulations applied to whole vines located in Lachish, Israel (cane pruning, moderate winter)

Combined Application of Various Concentrations of Armobreak® with Various Concentrations of DADS on Whole Vines The carrying canes of Cv. Crimson vines grown in Lachish, a late maturing growing region, were pruned to 15-node and were sprayed with 5% HC combined with 0.02% triton (HC positive control); with a negative control comprising 2% Armobreak®, with 2% Armobreak® combined with 6% DADS (appearing in FIG. 21 as "DADS 6%-Armo 2%"); with 4% Armobreak® combined with 6% DADS (appearing in FIG. 21 as "DADS 6%-Armo 4%"); or with 4% Armobreak® combined with 4% DADS (appearing in FIG. 21 as "DADS 4%-Armo 4%"). All of the experimental details are as described in Example 2. As shown in FIG. 21, both 6% DADS+2% Armobreak® as well as the 6% DADS and 4% Armobreak® enhance budbreak even better than the HC positive control, while the 4% DADS+4% Armobreak® formulation provides results similar to those of the negative control.

Example 20

Combined Application of Armobreak® with DADS/DMS on Whole Vines in Lachish

Figure 22:
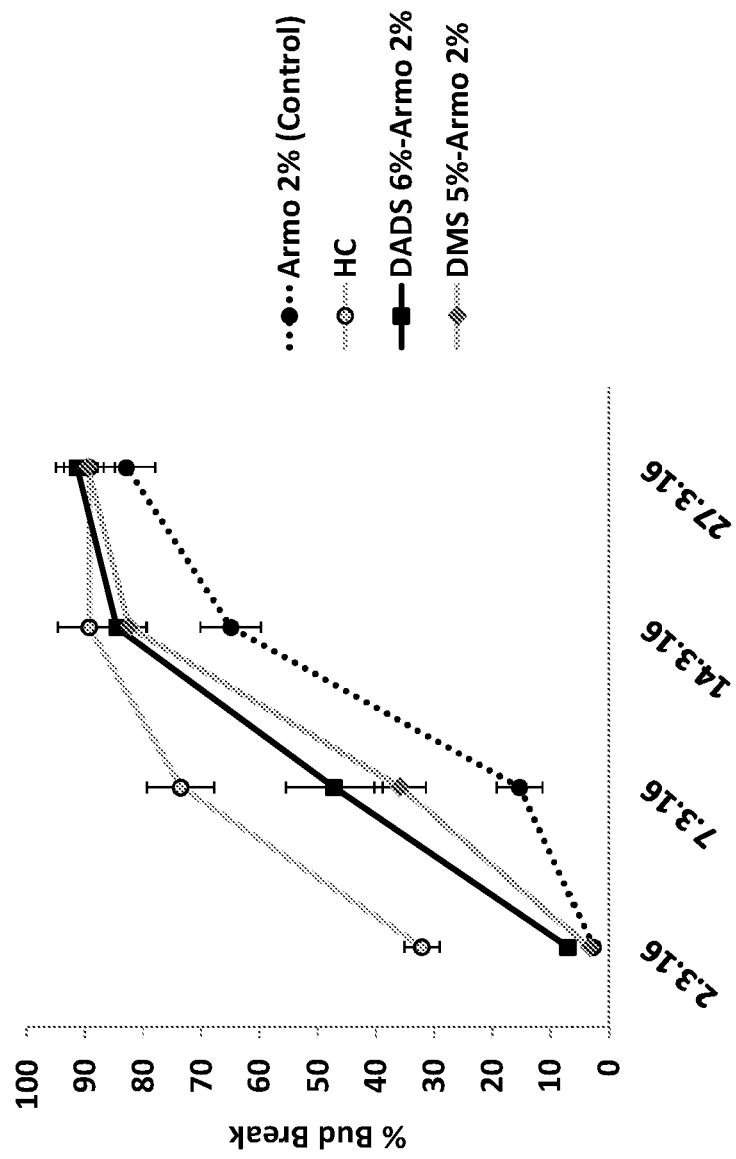
FIG. 22 presents a comparison between the bud break obtained from various Armobreak®, HC, DADS and DMS formulations applied to whole vines located in Lachish, Israel (cane pruning, moderate winter)

The canes of Cv. Thompson Seedless vines grown in Lachish were pruned to 15-node and were sprayed with 5% HC combined with 0.02% triton (HC positive control); with a negative control comprising 2% Armobreak®, with 2% Armobreak® combined with 6% DADS (appearing in FIG. 22 as "DADS 6%-Armo 2%"); or with 2% Armobreak® combined with 5% DMS (appearing in FIG. 22 as "DMS 6%-Armo 2%"). All of the experimental details are as described in Example 2. As shown in FIG. 22, both 6% DADS+2% Armobreak® and the 5% DMS+2% Armobreak® significantly enhance bud break, similarly to the HC positive control.

Example 21

Application of Armobreak®, DADS, HC, a Combination of DADS and Armobreak®, a Combination of DADS and L-77 on Whole Early Sweet Vines Grown in a Green House in the Jordan Valley, Israel Cv. Early Sweet vines grown in a greenhouse in Argaman in the Jordan Valley, Israel, were pruned very early in the dormancy cycle (on Dec. 4, 2016), to 3 node spurs. The vines were than sprayed with 5% HC (reference); 2% ArmoBreak (Armo 2% control); 4% ArmoBreak (Armo 4% control); 6% DADS (DADS 6% control); 6% DADS combined with 0.5% L-77 (DADS/L77); 6% DADS combined with 2% ArmoBreak (DADS/Armo 2%); or 6% DADS combined with 4% ArmoBreak (DADS/Armo 4). It is noted that L-77 is a known silicone surfactant. All of the experimental details are as described in Example 2. The experiment was conducted on Dec. 4, 2016, and the bud break was monitored in the vineyard on Dec. 18, 2016 (FIG. 23A) and Dec. 26, 2016 (FIG. 23B).

Figure 23B:
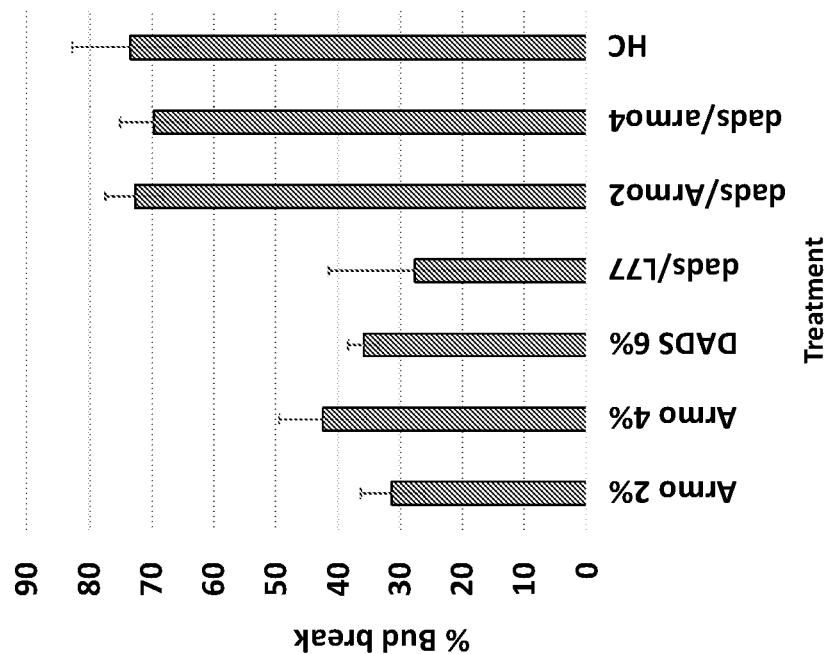
FIGS. 23A and 23B present a comparison between the bud break obtained at two different time points from various Armobreak®/DADS combinations, DADS/L-77 combination, and HC, DADS and Armobreak® controls. Treatments were applied to whole vines located in the Jordan Valley, Israel (greenhouse, hot winter).
Figure 23A:
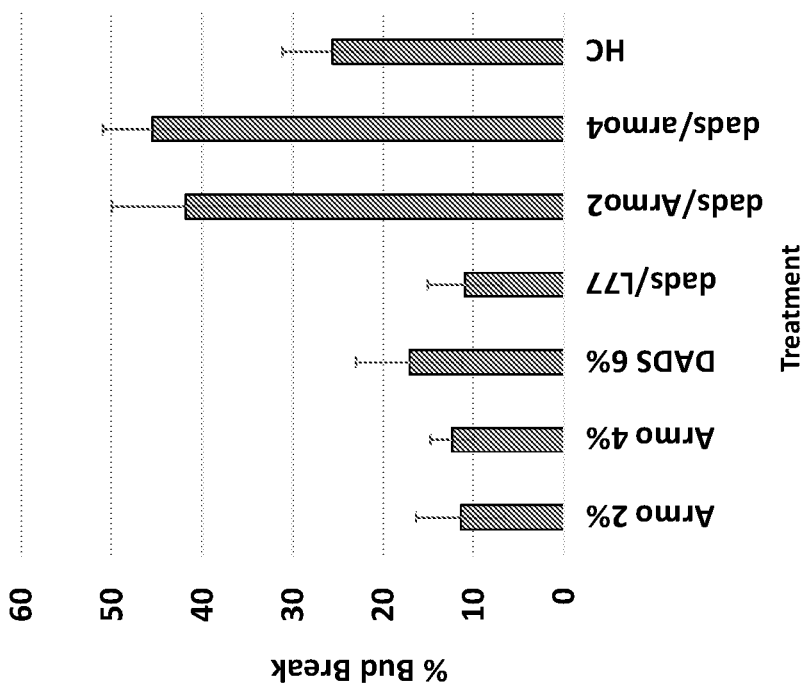

As shown in FIGS. 23A and 23B, not only does the combination of ArmoBreak® and DADS provide a result as good as the HC, it is apparent from a comparison to the controls of DADS alone and ArmoBreak® alone that the combination of DADS and ArmoBreak® is highly synergistic in bud break enhancing. In this respect it is noted that, as known in the field, at least in the tested species in the tested area and vineyard, between about 25-45% bud break is obtained naturally, without the application of any formulations, and therefore, each of the Armo 2%, Armo 4% and DADS 6% controls provide results within the range of the natural bud break, i.e., none of those formulations have a significant bud break enhancing effect. Only the combination of Armo 2%/4% together with 6% DADS provides the synergistic, significant, bud break enhancement.

It is further clear from the results presented in FIGS. 23A and 23B that DADS is extremely useful when combined with ArmoBreak®; however, not any delivery agent combined with DADS, e.g., DADS/L-77, is useful in enhancing bud break.

Overall, from examining all of the examples provided above, it appears that when applied to vineyards in hot winter regions and in greenhouses, where chilling is limited, the combination of sulfur containing compounds, such as DADS, and ArmoBreak® is extremely effective compared to control, and close in its effect to that of the sole effective commercial stimulus available to date, HC (as shown, e.g., in FIGS. 3, 16, 17 and 23 in Examples 3, 14, 15, 21).

When applied to spur pruned vineyard in region with higher chilling, both HC and the sulfur/Armo combinations have a milder effect or no effect, suggesting that untreated buds (or buds treated with Armo in the current study) are capable of efficient bud break. (as shown, e.g., in FIG. 19 and in Example 17).

When applied to cane pruned vineyards, known for the difficulty to achieve early, high and even bud break naturally, the sulfur/Armo combination significantly improve bud break even in regions with higher chilling (as in Zichron, Petachia and Lachish) (as shown, e.g., in FIGS. 18, 20, 21, 22 and in Examples 16, 18, 19, 20).

Importantly, it appears that unlike HC, late application of the sulfur/Armo combination is less likely to result in phytotoxic damage (as shown, e.g., in FIGS. 18 and 19).

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. Method of enhancing bud break in plants, comprising administering a combination comprising a synergistic effective amount of about 0.1-6.0% of an alkoxylated fatty alkyl amine polymer and about 0.1-6.0% of a sulfide compound to said plants, wherein said sulfide compound is selected from an alkyl sulfide and an allyl sulfide, or both.

2. The method according to claim 1, wherein the plant is a deciduous plant.

3. The method according to claim 1, wherein the plant is a grapevine, kiwi or rosacea.

4. The method according to claim 1, wherein the combination is administered to the plant bulbs, tubers, roots, branches, trunk or any combination thereof.

5. The method according to claim 1, wherein the alkoxylated fatty alkyl amine polymer and the sulfide compound are administered as a single formulation.

6. The method according to claim 1, wherein the alkoxylated fatty alkyl amine polymer and the sulfide compound are administered in two separate formulations, at the same time, consecutively, at the same intervals or any combination thereof.

7. The method according to claim 1, wherein the alkoxylated fatty alkylamine polymer is N, N-Bis-2-(omega-hydroxy polyoxyethylene/polyoxypropylen) ethylalkylamine).

8. The method according to claim 1, wherein the allyl sulfide is selected from diallyl disulfide (DADS), diallyl sulfide, diallyl trisulfide, and triallyl disulfide or any combination thereof; and wherein the alkyl sulfide is selected form diethyl sulfide, diethyl disulfide, dimethyl sulfide, dimethyl trisulfide, dimethyl disulfide, or any combination thereof.

9. The method according to claim 1, wherein the sulfide compound comprises diallyl disulfide (DADS).

10. A formulation for enhancing bud break in plants comprising a synergistic effective amount of about 0.1-6.0% of an alkoxylated fatty alkyl amine polymer and about 0.1-6.0% sulfide compound, wherein said sulfide compound is selected from an alkyl sulfide and an allyl sulfide, or both.

11. The formulation of claim 10, wherein the formulation is in a form of a spray.

12. The formulation of claim 10, wherein the sulfide compound is selected form the group consisting of diallyl disulfide (DADS), diallyl sulfide, diallyl trisulfide, diethyl sulfide, diethyl disulfide, dimethyl sulfide, dimethyl trisulfide, dimethyl disulfide, triallyl disulfide or any combination thereof.

13. The formulation of claim 10, wherein the alkoxylated fatty alkyl amine polymer is N, N-Bis-2-(omega-hydroxy-polyoxyethylene/polyoxypropylen) ethylalkylamine).

14. The formulation of claim 10, wherein the sulfide compound comprises diallyl disulfide (DADS).

* * * * *